Patented Oct. 12, 1954

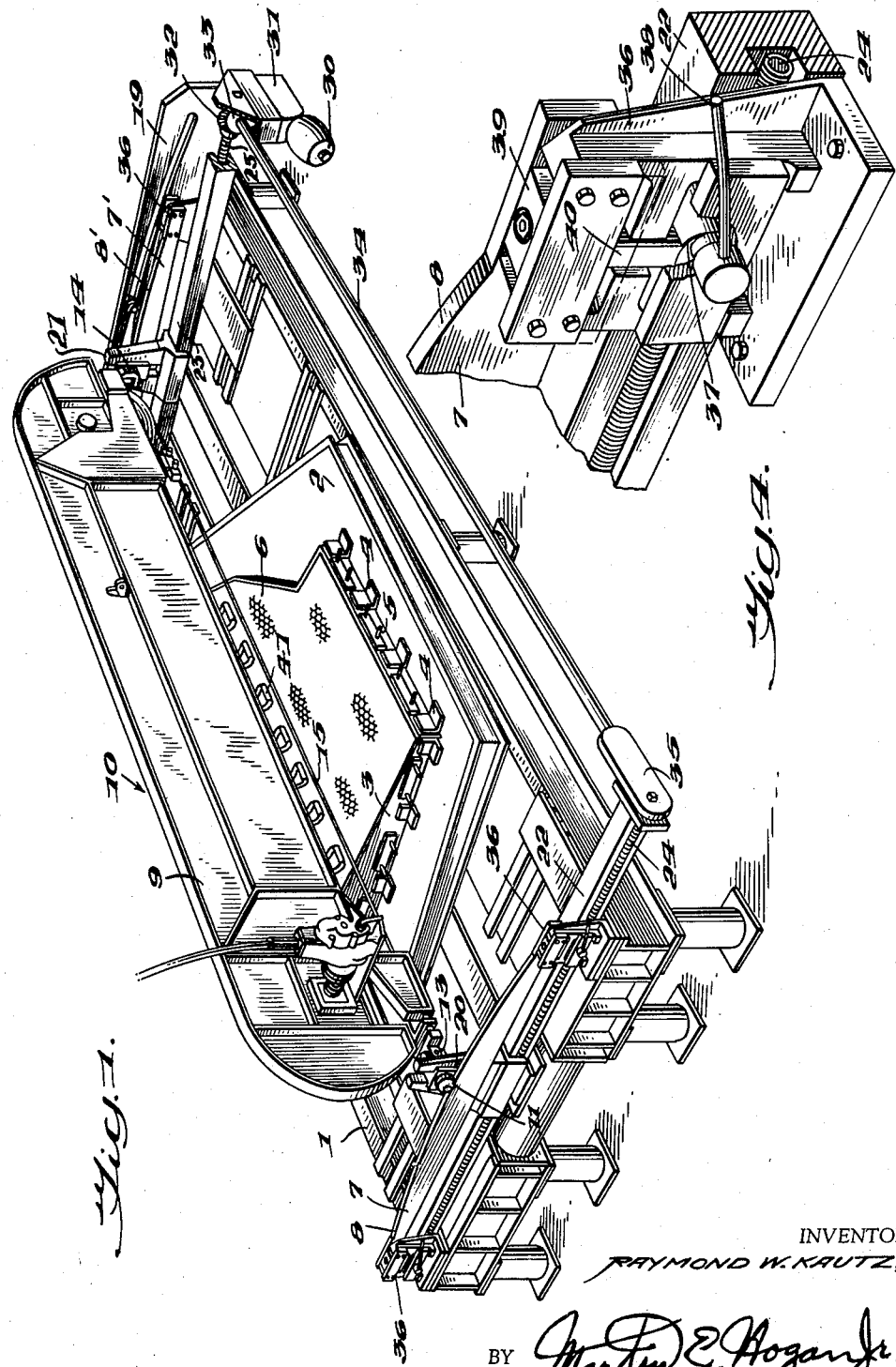

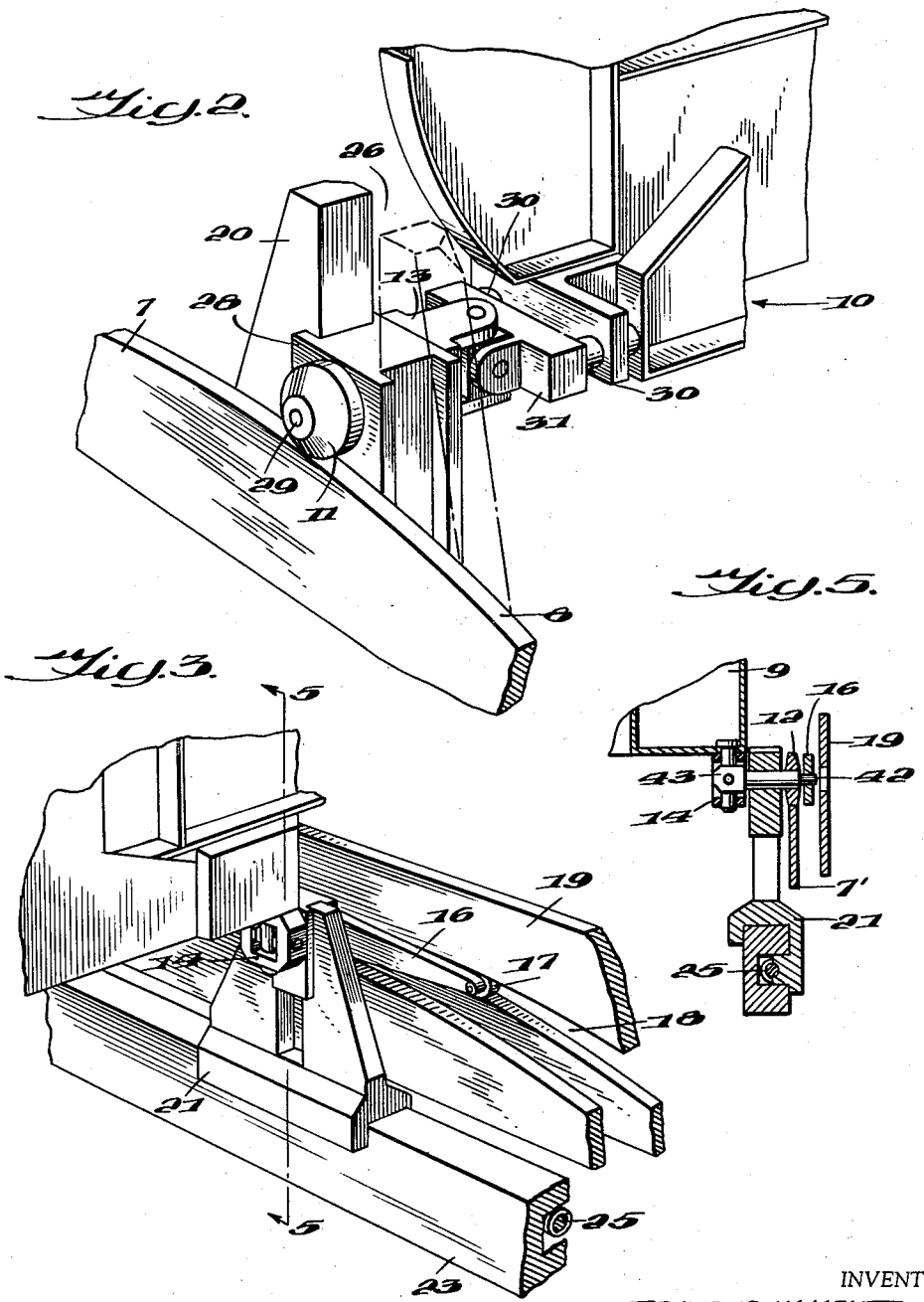

2,691,206

UNITED STATES PATENT OFFICE 2,691,206

CONTOUR CUTTING SAW

Raymond W. Kautz, Aero Acres, Md., assignor to The Glenn L. Martin Company, Middle River, Md., a corporation of Maryland Application June 18, 1952, Serial No. 294,133

9 Claims. (Cl. 29—68)

1

This invention relates to a machine for cutting contoured surfaces, and more particularly to a machine for cutting conic surfaces the straight line elements of which may pass through any pre-selected apex point.

In the production of certain structures such as aircraft wings and the like it is necessary to produce conic surfaces on large pieces of structural material. Since a relatively high degree of accuracy is required in the surfaces produced, ordinary methods of manufacture require the use of conventional milling cutters or similar cutting elements and are necessarily slow and costly. Moreover, in previously proposed machines, the cutting element has been mounted on a longitudinal carriage adapted to pivot about one of its ends which represents the apex of the conic surface to be produced. Therefore any machine of that type intended to produce a conic surface having a distant apex would necessarily be extremely long and unwieldy.

The machine contemplated by the present invention obviates the above stated difficulties by providing a carriage adapted to travel on a pair of arcuate tracks and carrying a band saw blade as a cutting element. Since the cutting edge of the saw blade is essentially a straight line, it is obvious that any conic surface may be developed by moving the carriage across a pair of appropriately shaped tracks so that the cutting edge of the saw blade is directed through the apex of the desired conic surface throughout the cutting operation. The length of such a machine is determined by the size of the surface to be generated rather than the location of the apex point with respect to the surface, thereby making it possible to produce conic surfaces of any desired slope however slight.

It is the object of this invention therefore, to provide a machine tool for rapidly and accurately cutting conic surfaces the straight line elements of which may pass through any predetermined point, however distant.

This and other objects of this invention will become apparent from the following description taken in connection with the accompanying drawings:

Fig. 1 is a general perspective view of the machine contemplated by the present invention.

Fig. 2 is a partial perspective view showing the manner of construction at one end of the carriage.

Fig. 3 is a partial perspective view showing the arrangement for maintaining the proper angular position of the carriage with respect to the work throughout the cutting operation.

2

Fig. 4 is a partial perspective view partly broken away to show the arrangement for raising the cam plate to a rough cut position.

Fig. 5 is a sectional view taken along line 5—5 of Fig. 3.

As shown in Figure 1, the machine comprises a frame-like structure forming a base 1 upon which is carried a rigid work bed 2. A work holder 3 is provided for holding the material 6 upon which the conic surface is to be formed, and is composed of a group of upstanding plates fastened to the bed 2 by means of brackets 4. A number of sharply pointed pins 5 extend through the sides of the plates and are adapted to be pushed into the material 6 to hold it in place within the holder 3. Obviously any other suitable work holder may be used, the one shown being intended specifically for use with thin wall cellular honeycomb structural material.

Mounted at opposite ends of the base 1 are a pair of parallel cam plates 7 and 7', the upper edges of which form arcuate cam surfaces 8 and 8' respectively, the shape of the cam surfaces being determined by the particular conic surface desired to be produced. The two cam plates form a pair of tracks upon which a traveling carriage, indicated generally at 10, is adapted to ride.

The carriage 10 includes a generally horizontally disposed power driven band saw 9 having a saw blade 15 and mounted on a pair of wheel shaped cam followers 11 and 12 by means of universal joints 13 and 14 respectively.

The actuating mechanism for the carriage 10 comprises a pair of tracks 22 and 23 mounted on base 1 parallel to cam plate 7 and 7' and which carry brackets 20 and 21 respectively with freedom for sliding motion therealong. A pair of actuating screws 24 and 25 extending longitudinally within the tracks engage internal threads within brackets 20 and 21 so that rotation of the screws will impart sliding motion to the brackets.

The connection between the bracket 20 and its associated end of the carriage 10 is shown in Figure 2, a similar connection being provided between bracket 21 and the other end of the carriage. As shown in the drawing, a vertical slot 26 in the bracket 20 engages the block 28 through which passes the shaft 29 of cam follower 11. Block 28 is free to slide vertically in slot 26, thus allowing cam follower 11 to follow the contour of cam surface 8 as carriage 10 is carried along by sliding motion of bracket 20 along track 22.

A motor 30 drives actuating screw 25 through suitable gearing contained within housing 31.

Rotation of screw 25 is transmitted to screw 24 through bevel gears 32 and 33, shaft 34, and a second set of bevel gears contained within housing 35. By utilizing the proper gear ratios, the relative speeds of brackets 20 and 21 may be made such that the line defined by the cutting edge of saw blade 15 at any position during the travel of the carriage 10 is a straight line element of the conic surface determined by the upper edges 8 and 8' of cam plates 7 and 7'. Thus by proper combination of gear ratios and cam plates, any given conic surface may be developed.

For any surface other than a portion of a right cone or a cylinder, the distance between the points of contact of cam followers 11 and 12 with their respective cam surfaces 8 and 8' will vary as the carriage 10 is moved along the cam surfaces. A sliding connection is therefore provided between universal joint 13 and band saw 9. As shown in Figure 2, the housing of the saw is slidably mounted on a pair of slide rods 30 which are fixed to the transverse element 31 of the universal joint, thus allowing the distance between the cam followers to vary as carriage 10 moves across the work bed 2.

To maintain the band saw 9 generally perpendicular to the surface being produced, so that blade 15 is positioned for proper cutting action throughout the motion of carriage 10, a slotted plate 19 is mounted parallel to cam plate 7 (see Figs. 3 and 5). One end of a crank arm 16 is fixed to the shaft 42 of cam follower 12 which is integral with the interior element 43 of the universal joint 14, and a follower 17 carried by the other end of the crank arm is positioned vertically by the slot 18 formed in the plate 19. Slot 18 is so shaped that the saw blade 15 is maintained tangent at its cutting edge to the surface being produced throughout the cutting operation.

To provide for a rough and a finish cut, each of the brackets 36 which support the cam plates 7 and 7' are provided with a cam 37 which may be rotated by means of a handle 38, as shown in Figure 4. A vertical plate 40 rests on the cam and is affixed at its upper end to block 39 which is in turn fastened to the cam plate. Rotation of each of the cams clockwise as viewed in the drawing will raise the cam plates 7 and 7' to the rough cut position shown in Figure 4. Counterclockwise rotation of the cams returns the cam plates to the finish cut position.

To hold the work 6 securely against the work bed 2 during the cutting operation, retractable rollers 41 are mounted at intervals along the housing of the band saw and press firmly on the work 6 along a line immediately preceding the cutting edge of the saw blade 15, thus preventing vertical movement or vibration of the work 6 and insuring accuracy in the cutting operation.

For a typical cutting operation, a pair of cam tracks 7 and 7' shaped to produce the desired surface is attached to the brackets 36. Cam 19, having a cam slot shaped to maintain the saw blade 15 in proper cutting relationship to the work 6 as previously described, is fastened to the end of bed 1 adjacent cam track 7'. A set of gears having a ratio selected to give the proper rate of rotation of actuating screw 24 relative to actuating screw 25 is installed within housing 35. The motor 30 is then operated to move carriage 10 to the forward limit of its travel, and the work 6 is fastened in place within the holder 3. Levers 38 are then swung clockwise to elevate the tracks 7 and 7' to the rough cut position. To begin the cutting operation, band saw 9 is started and motor 30 is operated in a direction to move the carriage along the cam tracks in a manner determined by the ratio of the gears selected as aforesaid and installed within housing 35. Universal joints 13 and 14 allow carriage 10 to move angularly with respect to the brackets 20 and 21 as cam followers 11 and 12 follow the respective curvatures of cam surfaces 8 and 8', while the sliding connection between the band saw and universal joint 13 compensates for the change in distance between the cam followers as the angular position of carriage 10 with respect to the cam plates 7 and 7' varies during the cutting stroke. At the end of the cut carriage 10 is restored to its initial position and levers 38 are swung counterclockwise to lower the cam plates to the position for the final cutting operation. The cutting operation is then repeated to form the surface desired and the completely contoured work is ready for removal from the holder.

The machine hereinbefore described will produce any desired conic surface, it being necessary only to provide for each surface desired the proper pair of cam plates and to select the necessary gear ratio between the actuating screws to give the proper motion to the carriage. It has been found possible, with a machine constructed in accordance with the foregoing description, to produce conic surfaces accurate to within five thousandths of an inch rapidly and easily.

While but one embodiment of this invention has been shown and described, it should be understood that the invention is not confined to the precise details of construction herein set forth, as it is apparent that many changes and variations may be made without departing from the scope of the invention as defined by the appended claims, and no limitation is intended by the phraseology of the foregoing description or the illustrations in the accompanying drawings.

I claim as my invention:

1. A machine tool comprising a supporting frame, work holding means supported thereon, means forming two geometrically similar laterally spaced arcuate cam surfaces of differing curvature carried by said frame, a cutting element having an elongated cutting edge supported at its ends by said cam surfaces for longitudinal movement therealong, and means for drivingly engaging the ends of said cutting element for moving them along said cam surfaces at relatively different rates with respect to one another.

2. A machine tool comprising a supporting frame, work holding means supported thereon, means forming two geometrically similar laterally spaced arcuate cam surfaces carried by said frame, a cutting element having an elongated cutting edge supported by said cam surfaces for longitudinal movement therealong, said cutting element being swingable about a transverse axis spanning said cam surfaces, means for moving said cutting element along said cam surfaces at a predetermined rate with respect to each said cam surface, and positioning means responsive to the longitudinal movement of said cutting element for simultaneously swinging said element about said axis to maintain said element in proper cutting position throughout its travel along said cam surfaces.

3. A machine tool comprising a supporting frame, work holding means supported thereon, means forming two geometrically similar arcuate cam surfaces carried by said frame, a carriage assembly including an elongated cutting element, a pair of cam follower means pivotally supporting said carriage at its opposite ends and adapted to ride one on each of said cam surfaces for longitudinal motion therealong, actuating means associated with each of said follower means for imparting longitudinal motion thereto, and means for operating said actuating means to simultaneously move said follower means along said cam surfaces at different rates with respect to one another.

4. A machine tool comprising a supporting frame, work holding means supported thereon, means forming two geometrically similar arcuate cam surfaces carried by said frame in spaced relationship to each other, a carriage assembly including an elongated cutting element, a pair of cam follower means supporting said carriage and adapted to ride one on each of said cam surfaces for longitudinal motion therealong, said carriage being pivotally connected to said follower means for movement about a transverse axis spanning said cam surfaces, actuating means associated with each of said follower means for imparting longitudinal motion thereto, gear means having a selected ratio interconnecting said actuating means, a cam disposed generally parallel to the direction of motion of said carriage, and a crank arm connected at one end to said carriage and having its other end operatively engaging said cam for controlling the position of said carriage about its pivotal connections with said cam followers to maintain said cutting element in proper cutting position throughout the motion of said carriage along said cam surfaces.

5. A machine tool comprising a supporting frame, work holding means supported thereon, a pair of upstanding plates carried by said frame in spaced relationship to each other, the upper edges of said plates forming geometrically similar cam surfaces of differing curvature, a carriage assembly including an elongated cutting element, a pair of cam follower means supporting said carriage and adapted to ride one on each of said cam surfaces for longitudinal movement therealong, actuating means operatively connected to each of said cam follower means for moving said follower means along said cam surfaces at a predetermined rate with respect to each other, a cam disposed generally parallel to the direction of motion of said carriage, and a crank arm connected at one end to said carriage and having its other end adapted to be positioned by said cam to maintain said cutting element in proper cutting position throughout the motion of said carriage along said cam surfaces.

6. A machine tool comprising a supporting frame, a work holder supported thereon, a pair of upstanding plates carried by said frame in spaced relationship to each other, the upper edges of said plates forming geometrically similar cam surfaces of differing curvature, a carriage assembly including an elongated cutting element, a pair of cam follower means supporting said carriage and adapted to ride one on each of said cam surfaces for longitudinal movement therealong, actuating means for moving said follower means along said cam surfaces comprising a member operatively connected to each of said follower means, a pair of actuating screws disposed generally parallel to said plates each engaging one of said members for imparting motion thereto longitudinally along said screws, and actuating means operatively connected to said screws for simultaneously rotating them so as to traverse said members therealong at relatively different rates with respect to one another.

7. A machine tool comprising a supporting frame, a work holder supported thereon, a pair of upstanding plates carried by said frame in spaced relationship to each other, the upper edges of said plates forming geometrically similar cam surfaces of differing curvature, a cam follower adapted to ride on each of said cam surfaces for longitudinal movement therealong, a carriage assembly including an elongated cutting element, said assembly being carried by said followers and extending transversely therebetween, actuating means for moving said followers along said cam surfaces at a predetermined rate with respect to each other comprising a pair of actuating screws disposed generally parallel to said plates, an element engaging each said follower with freedom for vertical motion with respect thereto, each of said elements being responsive to rotation of said screws for axial movement therealong, and gear means having a predetermined ratio interconnecting said screw means, means forming a cam slot disposed generally parallel to the direction of motion of said carriage, and an arm connected at one end to said carriage and engaged at its other end by said slot to maintain said cutting element in proper cutting position throughout the travel of said carriage along said cam surfaces.

8. A machine tool comprising a supporting frame, a work holder supported thereon, a pair of parallel upstanding plates carried by said frame, the upper edges of said plates forming geometrically similar arcuate surfaces, a pair of followers adapted to move along said surfaces, a carriage including an elongated cutting element disposed generally transverse to said plates, a universal joint connecting each said follower to said carriage, means forming a sliding connection interposed between one of said joints and said carriage, an actuating screw mounted parallel to each of said plates, a yoke element engaging each of said followers with freedom for vertical motion relative thereto, each said element also engaging one of said screws and responsive to rotation thereof to move axially therealong, gear means having a preselected ratio interconnecting said actuating screws, an upstanding plate having a cam slot formed therein mounted generally parallel to the direction of motion of said carriage, and an arm constrained at one end to ride in said slot and attached at its other end to said carriage to maintain said cutting element in proper cutting position throughout the travel of said carriage.

9. A machine tool comprising a supporting frame, work holding means supported thereon, a pair of parallel upstanding plates carried by said frame, the upper edges of said plates forming geometrically similar arcuate cam surfaces, cam means for adjusting the vertical position of said cam surfaces with respect to said work holding means, a carriage comprising a band saw disposed generally transverse to said plates, a pair of cam followers adapted to ride on said cam surfaces, a universal joint connecting each of said followers to said carriage, one of said universal joints being adapted to allow axial movement of its associated cam follower, an actuating screw mounted parallel to each of said plates, a yoke element engaging each of said followers with freedom for vertical motion relative thereto, each said element also engaging one of said screws and responsive to rotation thereof to move axially therealong, gear means having a preselected ratio interconnecting said actuating screws, an upstanding plate having a cam slot formed therein mounted generally parallel to the direction of motion of said carriage, and an arm constrained at one end to ride in said slot and attached at its other end to said carriage to maintain said cutting element in proper cutting position throughout the travel of said carriage.

References Cited in the file of this patent

UNITED STATES PATENTS

| Number | Name | Date |
|---|---|---|
| 10,662 | Benton | Mar. 21, 1854 |
| 681,926 | Patch | Sept. 3, 1901 |
| 1,571,557 | Paul | Feb. 2, 1926 |

FOREIGN PATENTS

| Number | Country | Date |
|---|---|---|
| 478,148 | Germany | June 18, 1929 |